F. E. LOUDY.
AEROFOIL.
APPLICATION FILED MAY 5, 1921.
1,419,277.
Patented June 13, 1922.
2 SHEETS—SHEET 1.
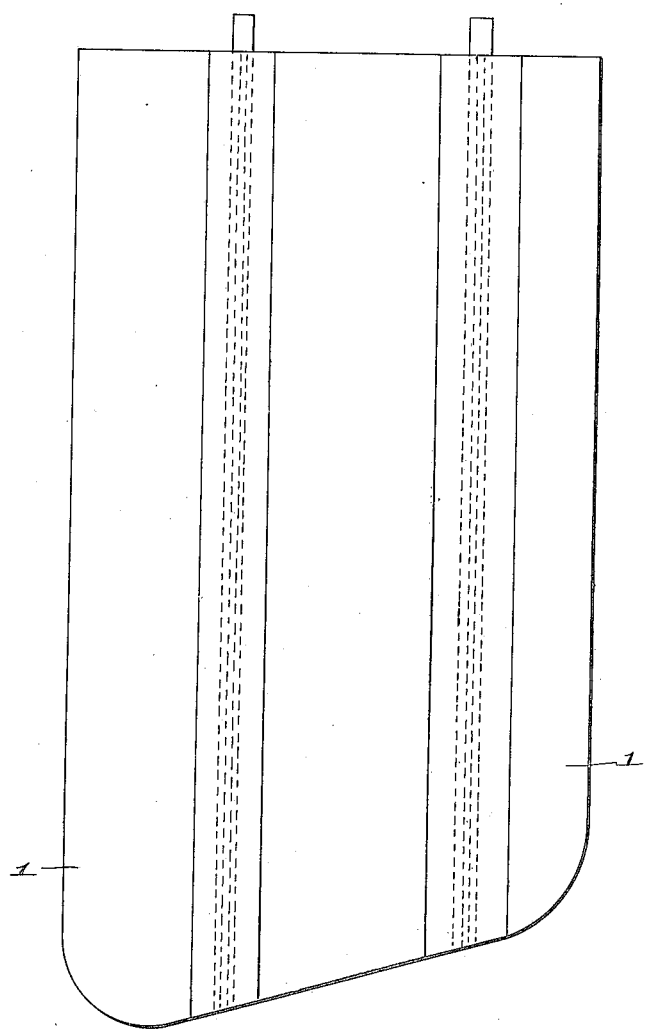
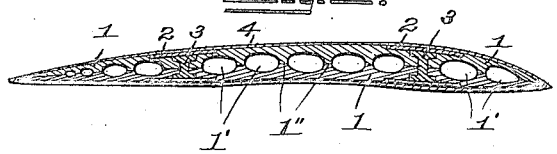

F. E. LOUDY.
AEROFOIL.
APPLICATION FILED MAY 5, 1921.
1,419,277.
Patented June 13, 1922.
2 SHEETS—SHEET 2.
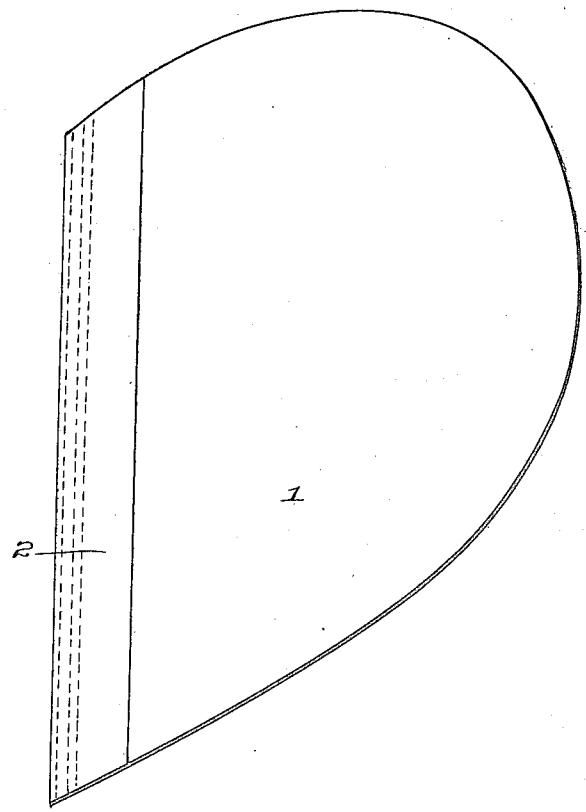
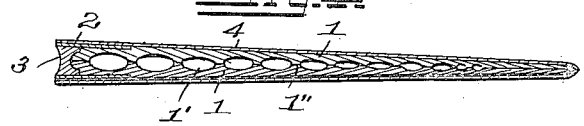
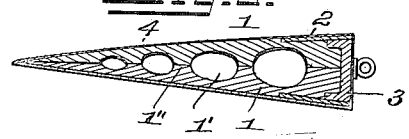

UNITED STATES PATENT OFFICE.

FLAVIUS E. LOUDY, OF MOBILE, ALABAMA.

AEROFOIL.

1,419,277. Specification of Letters Patent. Patented June 13, 1922.

Application filed May 5, 1921. Serial No. 466,924.

*To all whom it may concern:*

Be it known that I, FLAVIUS E. LOUDY, a citizen of the United States, residing at Mobile, in the county of Mobile and State of Alabama, have invented certain new and useful Improvements in Aerofoils, of which the following is a specification.

This invention relates to aerofoils, the broad object in view being to produce an aerofoil of light weight combined with high efficiency in point of strength and ability to resist warpage under bad weather conditions and rapid or extreme changes in atmospheric temperature.

By the term aerofoil, various surfaces are contemplated such for example as the wings or main aerial supporting surfaces of an aircraft, the ailerons, fins or stabilizers, vertical and horizontal, and movable stabilizing members such as the elevators and vertical rudder. The construction hereinafter described is not intended therefore to be limited to the wings and ailerons but is applicable to various other surfaces of aircraft in general and in fact to any feature of an aircraft requiring a structure which is light in weight, strong and capable of resisting weather conditions without liability of warpage.

With the above and other objects in view the invention consists in the novel construction, combination and arrangement herein fully described, illustrated and claimed.

In the accompanying drawings:—

Fig. 1 is a plan view of an aircraft wing or main supporting surface embodying the present invention;

Fig. 2 is a cross-section through the same;

Fig. 3 is a side elevation of the vertical rudder of an aircraft;

Fig. 4 is a section through the same;

Fig. 5 is a sectional view of an aileron.

The invention will best be understood by referring to Figure 2 of the drawings, wherein is illustrated a vertical sectional view through an airplane wing. In the make-up of the body of the wing I employ two surface forming members 1, 1, each of which is composed of solid material having an outer plane surface which, in the case of a wing structure, is usually cambered as shown, and an inner surface which is preferably routed out as indicated at 1' or in other words formed with substantially parallel grooves or channels leaving raised portions or ribs 1''. The surface formed members 1 are so proportioned or formed that the raised portions 1'' lie in contact and supporting relation to each other as shown in Figures 1, 4 and 5, and if desired such raised contacting portions may be adhesively united together, to thereby increase the ultimate strength of the wing structure.

The aerofoil comprises, in the construction thereof, one or more spars 3, each of which may be of any conventional or preferred formation in cross-section, the spars, two of which are shown in Figure 2 being illustrated as of I-beam formation. It will be observed that in order to form a complete wing, upper and lower surface forming members 1 are arranged in front of the forward spar 3, in rear of the rear spar 3 and between said spars. Therefore the body of the wing is practically solid with the exception of the routed out portions or channels 1' hereinabove referred to. The I-beams or spars 3 will ordinarily be composed of some light, strong wood such as spruce although other woods may be employed for the purpose. The surface forming members 1 will ordinarily be composed of balsa wood. The surface forming members 1 are fastened to the spars 3 by means of splicing members 2, the latter being preferably composed of ply-wood in strip form, the strips being of such width as shown in Figure 2 for example, as to extend forwardly and rearwardly of the spars and overlap the surface forming members. Said splicing members will be fastened to the spars and surface forming members by any suitable adhesive, such as glue. The surface forming members and the spars are also designed to be adhesively united in the same way. When the structure thus far described is completed, a skin 4 of any suitable material such as textile fabric is adhesively united to and throughout the entire top and bottom surfaces of the wing structure and the wing or other aerofoil may be finished by coating the same with any suitable dope, varnish or the like to give a smooth, uninterrupted surface to the top and bottom of the aerofoil and render the same impervious to moisture.

While the construction above described relates particularly to the formation of wings or main supporting surface, it will be apparent that the same construction will apply equally well to a vertical rudder as shown in Figures 3 and 4, an aileron as shown in Figure 5 and to any other stationary and movable supporting or stabilizing surface of aircraft.

Balsa wood is preferably used on account of the extreme lightness thereof, it being of less than one-half of the weight of cork and embodying much greater strength. By subjecting the balsa wood surface forming members to a hot bath the principal ingredient of which is paraffin, moisture contained in the wood is driven off in the form of steam. The bath is then allowed to cool while the wood is immersed therein. In cooling a vacuum is created in the cells of the wood and the paraffin is sucked into the wood. If upon weighing the wood, after cooling, appreciable gain in weight is noted the wood is put through a heating process which drives off any excess of paraffin. The surface forming members are then given an outside coat of paraffin to complete the water proofing thereof. They may be further coated with varnish, shellac, or other solution which will render them still further immune to the action of the atmosphere.

The completed article is extremely light, strong, and of minimum susceptibility to varying weather or atmospheric conditions. The structure is particularly valuable for war purposes as it may be riddled with bullets or projectiles without materially impairing its strength and supporting qualities. The structure eliminates the usual ribs and all drift trussing besides lending itself to rapid quantity production. It is also cheaper in construction and is productive of more efficient supporting and rarefaction surfaces than are found in aerofoils embodying the usual rib construction with a covering of fabric. The construction is also admirably adapted to tapering wings or thick wings or wings of deep cross-sectional formation. The wings are also highly buoyant and serve to support an aircraft on the surface of a body of water.

I claim:

1. An aerofoil embodying, in combination, a spar, and two surface-forming members having uninterrupted outer faces and also having portions of their inner faces in contact with each other, and splicing members overlapping said spar and surface-forming members and fastening the same together.

2. An aerofoil embodying, in combination, a spar, and two surface-forming members having uninterrupted outer faces and also having their inner faces routed out in such manner as to leave raised portions which contact with and mutually support each other.

3. An aerofoil embodying, in combination, a spar, and two surface-forming members composed of solid material having plane outer faces and having their inner faces routed out in such manner as to leave raised portions in supporting contact with each other.

4. An aerofoil embodying, in combination, two surface-forming members having uninterrupted and outer faces and also having portions of their inner faces routed out leaving raised positions in contact with each other.

5. An aerofoil embodying, in combination, a spar, and two surface-forming members composed of solid material having plane cambered outer faces and having their inner faces routed out in such manner as to leave raised portions in supporting contact with each other.

6. An aerofoil embodying, in combination, a spar, and two surface-forming members composed of solid material having plane outer faces and having their inner faces routed out in such manner as to leave raised portions in supporting contact with each other, and splicing members overlapping said spar and surface-forming members and fastening the same together.

7. An aerofoil embodying, in combination, a spar, and two surface-forming members composed of solid material having plane outer faces and having their inner faces routed out in such manner as to leave raised portions in supporting contact with each other, and an outer fabric skin adhesively applied to the above structure.

8. An aerofoil embodying, in combination, a spar, and two surface-forming members composed of solid material having plane outer faces and having their inner faces routed out in such manner as to leave raised portions in supporting contact with each other, and splicing members overlapping said spar and surface-forming members and fastening the same together, and an outer fabric skin adhesively applied to the above structure.

In testimony whereof I have affixed my signature.

FLAVIUS E. LOUDY.